Sept. 24, 1935.  M. T. LOTHROP  2,015,230
ROLLER BEARING
Filed Oct. 16, 1934
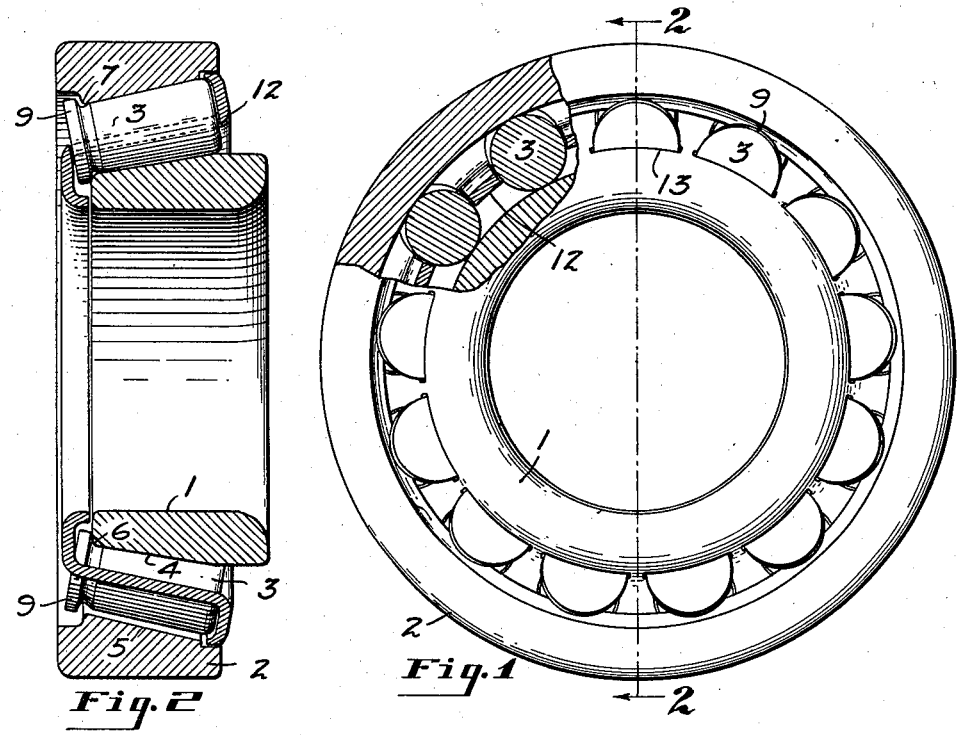
Fig. 1
Fig. 2
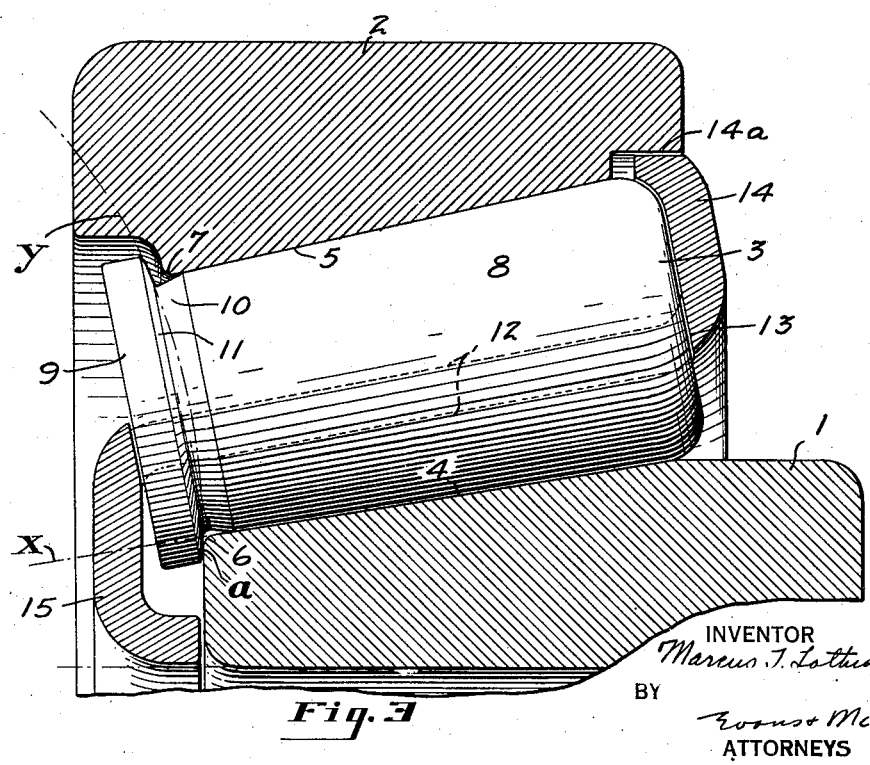
Fig. 3
INVENTOR
Marcus T. Lothrop
BY
Evans & McCoy
ATTORNEYS Patented Sept. 24, 1935

2,015,230

UNITED STATES PATENT OFFICE 2,015,230

ROLLER BEARING

Marcus T. Lothrop, Canton, Ohio; Margaret F. Lothrop executrix of said Marcus T. Lothrop, deceased Application October 16, 1934, Serial No. 748,493

5 Claims. (Cl. 308—214)

This invention relates to anti-friction bearings and more particularly to bearings of the tapered roller type.

One of the objects of the present invention is to provide a tapered roller bearing of simplified construction which may be economically manufactured and easily assembled and which will be more efficient in operation.

Another object is to provide an improved tapered roller bearing of such construction that the skidding action which occurs in conventional tapered roller bearings as a result of resistance to free rolling action is minimized.

Another object is to provide a tapered roller bearing in which end thrusts are taken by the rollers in such a manner that they will not deviate from their natural alignment.

Another object is to provide a tapered roller bearing which has the combined characteristics of a tapered roller bearing and a ball bearing.

A further object is to provide a tapered roller bearing in which each roller has a thrust flange at its smaller end and in which the thrust flange has a spherical surface disposed to engage the flat end face of the cone element with substantially a point contact.

A still further object is to provide a tapered roller bearing in which the tendency toward misalignment of the rollers is minimized.

With the above and other objects in view, which will be readily understood from the following description, the present invention consists in certain features of construction and combinations of parts which will be readily understood by those skilled in the art to which the invention appertains.

In the accompanying drawing, which illustrates a suitable embodiment of the invention:

Figure 1 is an end elevation of the roller bearing unit;

Fig. 2 is a section taken approximately on the line 2—2 of Fig. 1; and

Fig. 3 is a greatly enlarged transverse section taken through the cone and cup elements of the roller bearing unit, more clearly showing the contact that is made between the rollers and cone element.

Referring to the accompanying drawing, in which like numerals refer to like parts throughout the several views, the bearing of the present invention, as in conventional constructions, includes a pair of annular bearing elements, one of these being an inner race or cone 1, and the other being an outer race or cup 2. These, of course, are concentric and are spaced apart to receive tapered rollers 3.

The cone and cup elements are provided with opposed conical bearing surfaces 4 and 5 respectively, the lines of taper of which meet at a diminishing point on the axis of the cone, and the taper of the conical surfaces of the cone, cup and rollers being of any suitable degree.

The conical surfaces 4 and 5 of the cone and cup are uninterrupted from end to end so that they may be readily and economically ground and finished to accurate dimensions, there being no flanges or projections on either the cone or cup to interfere with a simple grinding operation.

Preferably, the inner corners 6 and 7 of the cone and cup elements, respectively, are slightly rounded so as to avoid sharp corners which might be chipped during handling of these elements.

Each of the tapered rollers 3 includes a main body portion 8 which is suitably tapered from end to end to cooperate with the conical bearing surfaces 4 and 5 of the cone and cup elements, a flange 9 at its smaller end and a slightly circumferentially recessed portion 10 integrally connecting the body and flange portions 8 and 9.

The flange 9 is of sufficient size to be intersected by the line of taper of the cone element 1 as indicated by "x" in Fig. 3.

The thrust surface 11 of the flange 9, as distinguished from prior constructions, is of spherical contour, as indicated at "y" in Fig. 3, so as to provide a point contact between the flat radial surface at the smaller end of the cone element 1, this point contact being as close to the line of taper of the cone element as is commercially practicable.

A suitable cage for separating and positioning the rollers 3 is employed in the construction shown and comprises a single piece conical shell 12 formed from sheet metal and having roller receiving slots 13 therein which open through the metal at the smaller end. The sides of the slots taper toward the small end of the cage so that the rollers may be closely confined therein. Also, the larger end of the cage 12 is provided with a flange 14 having its peripheral edge positioned relatively close to the wall of a recess 14a provided in the cup element 2, and with a flange 15 which extends radially inwardly, the internal diameter of the flange 15 being only slightly greater than the internal diameter of the cone element 1.

In the construction shown in Fig. 1 I have illustrated what may be termed a cup assembly, that is, one in which the cup element 2, rollers 3 and cage 12 form one assembly to which the cone element 1 may be separately assembled. In this case it will be noted that the line of taper of the outer surface of the conical shell forming the cage 12 lies substantially at or within the pitch line of the rollers 3 in order that the cage will hold the rollers in position within the cup element 2 when the cone element is removed.

It is obvious, however, that by increasing the size of the shell of the cage in such a manner that the line of taper of the inner surface of the shell lies outwardly of the pitch line of the rollers, a cone assembly may be provided.

The large view illustrated in Fig. 3 is approximately ten times the actual size of the roller bearing unit illustrated and the unit is shown in this manner to more clearly indicate the spherical contour of the abutment face 11 of the roller flange 9. This spherical face 11 provides a point contact "a" with the cone element 1, as indicated in Fig. 3.

This point contact occurs as close as commercially practicable to the line of rolling contact between the roller and cone element, and although it appears to be some distance from the line of rolling contact in Fig. 3, it is, as a matter of fact, in a bearing of normal size, relatively close to the line of rolling contact.

In prior roller bearing units having flanged rollers, the natural alignment characteristics of the rollers with the cone and cup elements are disturbed through friction created by the engagement of the substantial portion of the flange face with a rib or face on the cone element. This tends to increase wear and also to cause the rollers to run out of alignment, which likewise increases wear, since a true rolling action is not permitted. In the roller bearing of the present invention, in which the flange face 11 of each roller is spherical and has a point contact with the cone element relatively close to the line of rolling contact of each roller with the cone element, the action simulates that of a ball bearing, that is, a rolling action, with a result that the frictional forces which tend to produce skidding action are minimized.

End thrust is taken at the smaller ends of the rollers and relatively close to the line of rolling contact, thus leaving the larger end of the roller free of any end thrust engagement with any part of the bearing unit, so that the position of the roller is partly controlled by the engagement of the spherical surface 11 with the cone element. However, since this control is through a rolling point contact relatively close to the line of rolling contact in which frictional forces are minimized, the natural alignment characteristics of the cone and cup tend to properly maintain each roller in its proper position for true rolling.

Although several embodiments of the invention have been herein shown and described, it will be understood that numerous details of the construction shown may be altered or omitted without departing from the spirit of this invention as defined in the following claims.

What I claim is:

1. A taper roller bearing comprising concentric cone and cup elements having conical roller engaging surfaces, the outer periphery of said cone element and the inner periphery of said cup element being unobstructed from end to end, and a plurality of tapered rollers disposed between and in contact with said surfaces, each of said rollers having a flange at its smaller end provided with a spherical face facing one of said elements and engaging a substantially radial surface thereof at a point relatively close to the line of the conical surface of the element with which it is engaged.

2. A taper roller bearing comprising concentric cone and cup elements having conical roller engaging surfaces, the outer periphery of said cone element and the inner periphery of said cup element being unobstructed from end to end, and a plurality of tapered rollers disposed between and in contact with said surfaces, each of said rollers having a flange at its smaller end provided with a spherical face, said cone element having at its smaller end a substantially radial surface, said spherical face being faced toward and engaged with said radial surface at a point substantially on the line of contact of the roller with the conical surface of said cone element.

3. A taper roller bearing comprising concentric cone and cup elements having conical roller engaging surfaces, the outer periphery of said cone element and the inner periphery of said cup element being unobstructed from end to end, and a plurality of tapered rollers disposed between said surface, each of said rollers having at its smaller end a flange of greater diameter than the minimum diameter of the roller provided with a spherical face facing an end face of one of said elements, said spherical face having rolling substantially non-frictional point engagement with said end face relatively close to the line of the roll seat of the said one element, whereby said cone and cup elements will properly align said rollers.

4. A taper roller bearing comprising concentric inner and outer races having conical roller engaging surfaces, the outer periphery of said inner race and the inner periphery of said outer race being unobstructed from end to end, a plurality of spaced tapered rollers contacting said surfaces, a cage for maintaining said rollers in spaced relation, said inner race having an annular radial surface at its end of smaller diameter, and each of said rollers having a flange at its smaller end, said flange having a spherical surface facing and in engagement with said annular radial surface at a point relatively close to the line of rolling contact of the said roller with said inner race.

5. A taper roller bearing comprising concentric inner and outer races having conical roller engaging surfaces, the outer periphery of said inner race and the inner periphery of said outer race being unobstructed from end to end, a plurality of spaced tapered rollers contacting said surfaces, a cage for maintaining said rollers in spaced relation, said inner race having an annular radial surface at its end of smaller diameter, and each of said rollers having a flange at its smaller end, said flange having a spherical surface facing and in engagement with said annular radial surface at a point relatively close to the line of rolling contact of the said roller with said inner race, said cage being conical and disposed within the pitch line of said rollers whereby to provide an outer race-roller assembly.

MARCUS T. LOTHROP.